US008374220B2

(12) United States Patent
Verzegnassi et al.

(10) Patent No.: US 8,374,220 B2
(45) Date of Patent: Feb. 12, 2013

(54) LOW-COST AND LOW-COMPLEXITY INNER COMMUNICATION RECEIVER FOR RECEIVE DIVERSITY

(75) Inventors: Rodolfo Verzegnassi, Nice (FR); Fabrizio Tomatis, Vallauris (FR)

(73) Assignee: St-Ericsson SA, Geneva (CH)

( * ) Notice: Subject to any disclaimer, the term of this patent is extended or adjusted under 35 U.S.C. 154(b) by 929 days.

(21) Appl. No.: 12/302,601

(22) PCT Filed: May 15, 2007

(86) PCT No.: PCT/IB2007/051854
§ 371 (c)(1),
(2), (4) Date: May 29, 2009

(87) PCT Pub. No.: WO2007/138516
PCT Pub. Date: Dec. 6, 2007

(65) Prior Publication Data
US 2009/0238247 A1 Sep. 24, 2009

(30) Foreign Application Priority Data
May 29, 2006 (EP) .................................... 06300527

(51) Int. Cl.
*H04B 1/00* (2006.01)

(52) U.S. Cl. ........ 375/148; 375/147; 375/140; 375/130; 375/144; 375/316; 375/346

(58) Field of Classification Search .................. 375/148, 375/147, 150, 130, 144, 316, 346
See application file for complete search history.

(56) References Cited

U.S. PATENT DOCUMENTS

| | | | | |
|---|---|---|---|---|
| 6,215,814 B1* | 4/2001 | Ylitalo et al. | ................. | 375/148 |
| 6,956,841 B1* | 10/2005 | Stahle et al. | ................. | 370/342 |
| 6,987,746 B1* | 1/2006 | Song | ............................. | 370/335 |
| 7,061,967 B2* | 6/2006 | Schelm et al. | ................ | 375/147 |
| 7,286,593 B1* | 10/2007 | Banerjee | ....................... | 375/148 |
| 2002/0090038 A1 | 7/2002 | Dabak et al. | | |
| 2002/0196842 A1 | 12/2002 | Onggosanusi et al. | | |
| 2004/0017843 A1* | 1/2004 | Fitton et al. | ................... | 375/148 |

(Continued)

OTHER PUBLICATIONS

Siavash, M. Alamouti, "A Simple Transmit Diversity Technique for Wireless Communications", IEEE Journal on Selected Areas in Communications, IEEE Service Center, Piscataway, US, vol. 16, No. 8, Oct. 1998, XP011054845, ISSN: 0733-8716, pp. 1451-1458.
PCT International Search Report PCT/IB2007/051854, mailing date Oct. 15, 2007.

*Primary Examiner* — Kenneth Lam
(74) *Attorney, Agent, or Firm* — William J. Kubida; Peter M. Jarvis; Hogan Lovells US LLP

(57) ABSTRACT

A communication receiver includes first and second antenna elements for receiving first and second signals respectively representative of first and second symbols encoded with a first or second channel coefficient and first and second delay lines for delaying the first and second signals respectively. A master rake module up-samples a pilot channel sequence at chip rate to mix it with the second delayed signals to deliver correlated delayed signals and to determine first and second channel coefficient estimates from the first delayed signals and the correlated delayed signals. A slave rake module determines first and second auxiliary composite symbols from the first and second delayed signals, a scrambling code sequence and a spreading code sequence. Lastly the first and second auxiliary composite symbols combine with the first and second channel coefficient estimates to determine first and second output signals.

10 Claims, 2 Drawing Sheets

U.S. PATENT DOCUMENTS

| | | |
|---|---|---|
| 2005/0069024 A1* | 3/2005 | Li et al. .................. 375/148 |
| 2005/0128934 A1* | 6/2005 | Gu et al. .................. 370/206 |
| 2006/0227908 A1* | 10/2006 | Scharf et al. .................. 375/346 |
| 2007/0160119 A1* | 7/2007 | Ardichvili et al. ............ 375/149 |

* cited by examiner

LOW-COST AND LOW-COMPLEXITY INNER COMMUNICATION RECEIVER FOR RECEIVE DIVERSITY

CROSS-REFERENCE TO RELATED APPLICATIONS

The present application is a U.S. national filing of PCT/IB2007/051854 filed May 15, 2007, which is incorporated by reference herein in its entirety.

FIELD OF THE INVENTION

The present invention relates to inner communication receivers, and more particularly to inner communication receivers implementing receive diversity.

"Receive diversity" is meant to be understood here as the capability to combine or select signals received from a same source on two spatially separated antenna elements and which may vary in their fading characteristics at a given time.

BACKGROUND OF THE INVENTION

As is known by one skilled in the art, in order to combat multipath fading and interference in mobile networks, such as UMTS ones, it has been proposed to introduce receive diversity into (inner) communication receivers. A receive diversity inner receiver comprises two antenna elements respectively arranged to receive the same signals representative of information symbols through channels with similar characteristics, and a rake comprising a master rake module, a slave rake module and a derotator arranged to process the received signals, so that they do not cancel each other and allows their information symbols to be retrieved.

Thanks to this receive diversity the receiver receives a signal with twice the strength, i.e. with a gain of 3 dB in SNR ("Signal-to-Noise Ratio"), which leads to a still greater gain in terms of BER ("Bit Error Rate") and BLER ("Block Error Rate") due to the non-linear behaviour of the channel coding gain. Unfortunately receive diversity requires to double the receiver complexity, size and power consumption, so that introducing receive diversity is almost equivalent to using two classical receivers in the same handset (or mobile communication equipment).

OBJECT AND SUMMARY OF THE INVENTION

One object of the present invention is to overcome at least partly this drawback.

For this purpose, one embodiment of the present invention provides a communication receiver, comprising: p1 a first antenna element arranged to receive first signals representative of first and second symbols encoded with a first channel coefficient, a second antenna element arranged to receive second signals representative of the first and second symbols encoded with a second channel coefficient, first and second delay tines to delay the first and second signals respectively, a master rake means fed with the first and second delayed signals and with a pilot channel sequence and arranged to up-sample this pilot channel sequence at chip rate in order to mix it with the second delayed signals for delivering correlated delayed signals and to determine first and second channel coefficient estimates from these first delayed signals and correlated delayed signals, a slave rake means fed with the first and second delayed signals and with a scrambling code sequence and a spreading code sequence and arranged to determine first and second auxiliary composite symbols from the first and second delayed signals, scrambling code sequence and spreading code sequence, and a combining means arranged to combine the first and second auxiliary composite symbols with the first and second channel coefficient estimates in order to determine first and second output signals representative of the first and second symbols respectively, times the sum of the first channel coefficient estimate squared and second channel coefficient estimate squared.

The communication receiver according to another embodiment of the present invention can include additional characteristics considered separately or combined, and notably:

its master rake means can comprise:

a sampling means arranged to up-sample the pilot channel sequence at chip rate in order to deliver an up-sampled sequence, a multiplier means arranged to multiply the second delayed signals by the up-sampled sequence in order to deliver the correlated delayed signals, an adding means arranged to add the first delayed signals to the correlated delayed signals, and an estimation means arranged to determine first and second channel coefficient estimates from the result of the addition;

its master rake means may further comprise a processing means arranged to apply a complex conjugation to the first channel coefficient estimate in order to deliver a first channel coefficient estimate complex conjugate;

its master rake means may further comprise a processing means arranged to apply a complex conjugation to the second channel coefficient estimate in order to deliver a second channel coefficient estimate complex conjugate;

its slave rake means can comprise:

first and second branches connected to the first and second delay lines respectively and each comprising a descrambler for descrambling the first or second delayed signal with a scrambling code sequence, and a despreader, for despreading the first or second descrambled delayed signal with a spreading code sequence in order to output first and second intermediate composite symbols representative of the first and second symbols respectively times the first or second channel coefficient, a first buffer means arranged to temporarily store the first and second intermediate composite symbols respectively representative of the first symbol times the first channel coefficient and the second symbol times the first channel coefficient, a second buffer means arranged to temporarily store the first and second intermediate composite symbols respectively representative of the first symbol times the second channel coefficient and the second symbol times the second channel coefficient, a first processing means arranged to apply a complex conjugation to the first intermediate composite symbol stored in the second buffer means in order to deliver a third intermediate composite symbol, a second processing means arranged to apply a complex conjugation to the first intermediate composite symbol stored in the second buffer means and then to change the sign thereof to deliver a fourth intermediate composite symbol, a first adding means arranged to add the first intermediate composite symbol stored into the first buffer means with the fourth intermediate composite symbol to deliver the first auxiliary composite symbol, a second addition means arranged to add the second intermediate composite symbol stored into the first buffer means with the third intermediate composite symbol in order to deliver the second auxiliary composite symbol, and a third buffer means arranged to temporarily store the first and second auxiliary composite symbols;

its combining means can comprise:

a first multiplier means arranged to multiply the first auxiliary composite symbol by the first channel coefficient estimate complex conjugate in order to output a third auxiliary composite symbol, a third processing means arranged to apply a complex conjugation to the second auxiliary composite symbol in order to output a second auxiliary composite symbol complex conjugate, a second multiplier means arranged to multiply the second auxiliary composite symbol complex conjugate by the second channel coefficient estimate complex conjugate in order to output a fourth auxiliary composite symbol, a first adder arranged to add the third and fourth auxiliary composite symbols in order to deliver the first output signal, a fourth processing means arranged to apply a complex conjugation to the first auxiliary composite symbol and then to change the sign thereof in order to output a fifth auxiliary composite symbol, a third multiplier means arranged to multiply the fifth auxiliary composite symbol by the second channel coefficient estimate complex conjugate in order to output a sixth auxiliary composite symbol, a fourth multiplier means arranged to multiply the second auxiliary composite symbol by the first channel coefficient estimate complex conjugate in order to output a seventh auxiliary composite symbol, and a second adder arranged to add the sixth and seventh auxiliary composite symbols to deliver the second output signal.

its combining means may further comprise a first processing means arranged to apply a complex conjugation to the first channel coefficient estimate in order to deliver the first channel coefficient estimate complex conjugate;

its master rake means may further comprise a second processing means arranged to apply a complex conjugation to the second channel coefficient estimate in order to deliver the second channel coefficient estimate complex conjugate the pilot channel sequence can be a CPICH ("Control Pilot Channel") transmit diversity (TxD) sequence.

The invention also provides, according to one embodiment, mobile communication equipment comprising a communication receiver such as the one introduced above. Such mobile communication equipment may be a mobile telephone, for instance.

BRIEF DESCRIPTION OF THE DRAWINGS

Other features and advantages of the invention will become apparent on examining the detailed specifications hereafter and the appended drawings, wherein.

The appended drawings may not only serve to complete the invention, but also to contribute to its definition, if need be.

DESCRIPTION OF EMBODIMENTS

Figure 1:
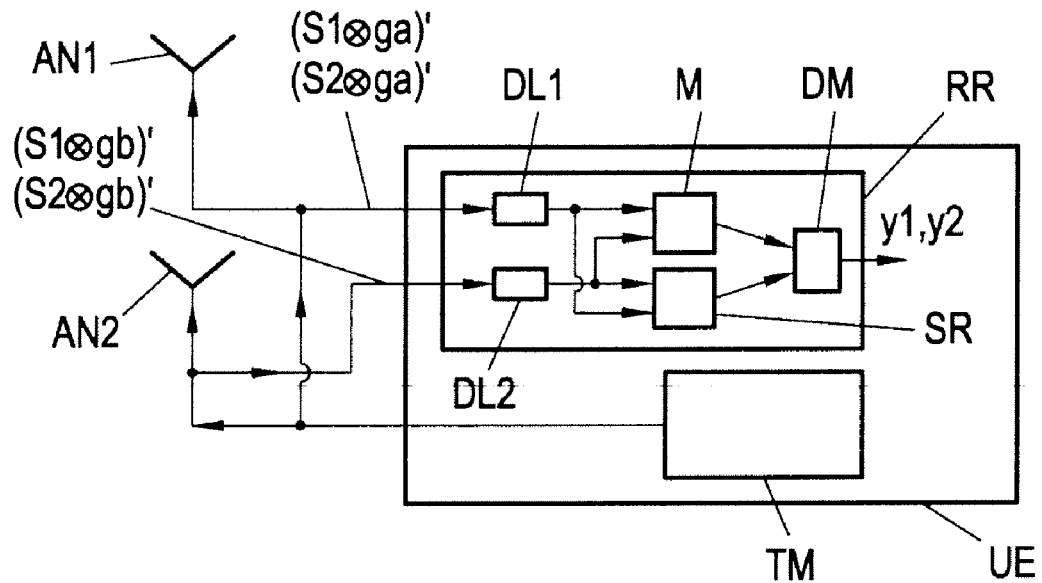
FIG. 1 schematically and functionally illustrates mobile communication equipment comprising a communication receiver according to the invention, FIG. 2 schematically illustrates an example of embodiment of a master rake module of a communication receiver according to the invention, FIG. 3 schematically illustrates an example of embodiment of a slave rake module of a communication receiver according to the invention, and FIG. 4 schematically illustrates an example of embodiment of a combining module (or derotator) of a communication receiver according to the invention.

Reference is initially made to FIG. 1 to describe an example of communication receiver RR according to the invention. Such a communication receiver RR may be installed in mobile communication equipment UE, such as a mobile telephone, adapted to radio communication in a UMTS network implementing receive diversity. But it is important to notice that the invention is neither limited to this type of communication equipment nor to this type of communication network. Indeed, it applies to any wireless CDMA networks implementing receive diversity.

The mobile telephone UE is arranged to transmit and receive signals representative of data packets to and from a base station (Node B) of the UMTS network. The invention only concerns the processing of the received signals by the communication receiver RR but not the signals generated by the communication transmitter TM of the mobile telephone UE.

As schematically illustrated in FIG. 1, a communication receiver RR according to the invention comprises first AN1 and second AN2 antenna elements, for receiving (and transmitting) radio signals, first DL1 and second DL2 delay lines, a master rake module MR, a slave rake module SR and a combining module (sometimes called "derotator") DM.

It is recalled that in a UMTS network implementing receive diversity, a base station (Node B) transmits to a mobile telephone UE first signals representative of first S1 and second S2 symbols (of information) which are received by a first antenna AN1 with a first channel coefficient ga and second signals also representative of the first S1 and second S2 symbols but received by a second antenna AN2 with a second channel coefficient gb. The first antenna element AN1 of the communication receiver RR is notably arranged to receive the first signals ((S1⊗ga)' and (S2⊗ga)') while the second antenna element AN2 of this communication receiver RR is notably arranged to receive the second signals ((S1⊗gb)' and (S2⊗gb)'). The symbol "'" means that scrambling and spreading processes have been applied to the composite symbols concerned (for instance (S1⊗gb)').

In the case where the diversity is of the STTD type ("Space Time Transmit Diversity") the base station is transmitting two signals to the mobile by means of two antennas. The communication receiver RR does not know the channel coefficients ga and gb corresponding to these two transmitted signals. So it has to estimate these channel coefficients ga and gb in order to be capable of retrieving the first S1 and second S2 symbols. The master rake module MR is dedicated to channel coefficient estimate, while the slave rake module SR is intended for determining first r1 and second r2 auxiliary composite symbols, which are used by the combining module DM with the channel coefficient estimates ga and gb in order to retrieve the first S1 and second S2 symbols.

As is illustrated in FIG. 1, the first DL1 and second DL2 delay lines are fed with the first (digital) signals (S1⊗ga)' and (S2⊗ga)' and the second (digital) signals (S1⊗gb)' and (S2⊗gb)' received by the first AN1 and second AN2 antenna elements respectively. They are intended to delay the first and second (digital) signals respectively in order to introduce a chosen time shift between them. The delay lines are used to recover the delay due to the multipath. It is assumed that the multipath of the first AN1 and second AN2 antennas are perfectly synchronized (which is correct since they are collocated in the mobile communication receiver RR).

The first DL1 and second DL2 delay lines feed both the master rake module MR and the slave rake module SR with first ((S1⊗ga)' and (S2⊗ga)') and second ((S1⊗gb)' and (S2⊗gb)') delayed signals.

Figure 2:
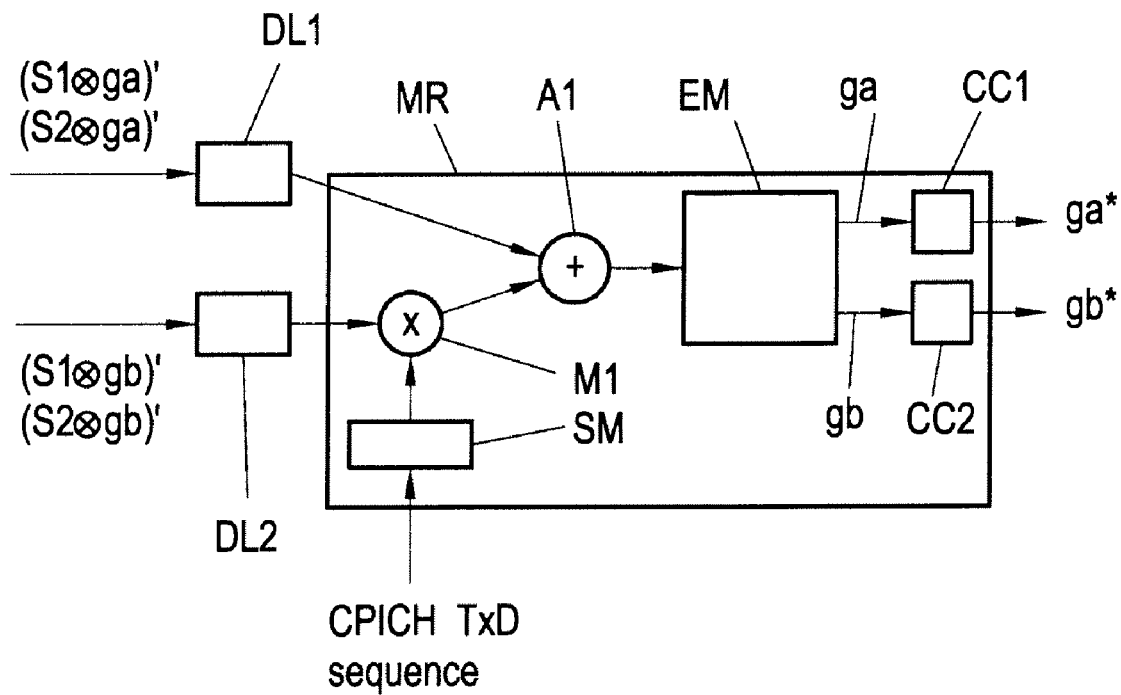

As is illustrated in FIG. 2, the master rake module MR is also fed with a pilot channel sequence, which is for instance a CPICH ("Control Pilot Channel") transmit diversity sequence (notably defined in the technical specification TS 25.211 of the 3GPP). It is recalled that such a sequence is constituted by bits which are the combination of the full "1" sequence and of the STTD sequence pattern (−1, +1, +1, −1, −1, +1, +1, −1, ... ). This encoding scheme is called Alamouti encoding in the literature.

The master rake module MR preferably comprises a sampling module SM arranged to up-sample the pilot channel sequence (CPICH) at chip rate, i.e. 256 integrations (classical integration and dump operation).

The master rake module MR is arranged to mix the second delayed signals with the up-sampled pilot channel sequence (CPICH) in order to deliver second correlated delayed signals. In other words it operates in a transmit diversity (TxD) mode. For instance, this mixing is carried out by a multiplier M1.

The master rake module MR classically comprises an estimation module EM (sometimes called "master rake block") which uses the first delayed signals and the second correlated delayed signals to estimate the first ga and second gb channel coefficients with the encoding of the transmitted signal known a priori.

As is illustrated in FIG. 2, the master rake module MR may further comprise a first prosing module CC1 which is intended for applying a complex conjugation to the first channel coefficient estimate ga output by the estimation module EM in order to convert this first channel coefficient estimate ga into a first channel coefficient estimate complex conjugate ga*. The interest of this conversion will appear below.

Instead of the first processing module CC1 or in combination with it, and as is illustrated in FIG. 2, the master rake module MR may also further comprise a second processing module CC2 which is intended for applying a complex conjugation to the second channel coefficient estimate gb output by the estimation module EM in order to convert this second channel coefficient estimate gb into a second channel coefficient estimate complex conjugate gb*. The interest of this conversion will also appear below.

Figure 3:
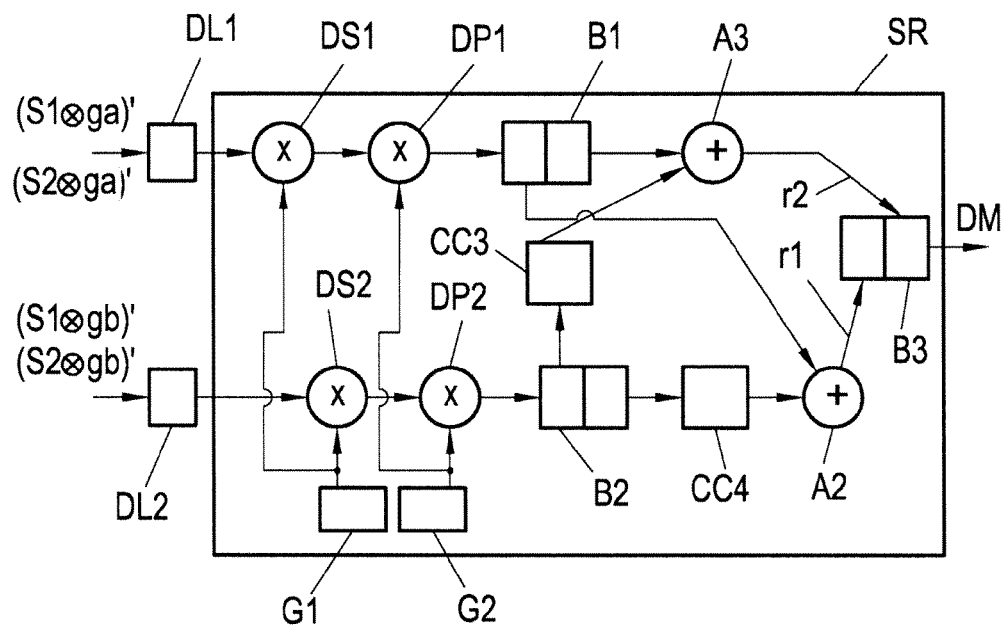

As is illustrated in FIG. 3, The slave rake module SR is not only fed with the first and second delayed signals, but also with a scrambling code sequence and a spreading code sequence in order to determine first r1 and second r2 auxiliary composite symbols.

For instance, the scrambling code sequence may be a gold code sequence and the spreading code sequence may be a Hadamard channelization code sequence (or OVSF).

The input sequence at chip rate is then de-scrambled and de-spread (OVSF with a spreading factor SF). The output sequence is at symbol rate.

The mathematical expressions of these first r1 and second r2 auxiliary composite symbols may be as follows:

$$r1 = S1 \otimes ga - S2^* \otimes gb^* \quad (1)$$

$$r2 = S2 \otimes ga + S1^* \otimes gb^* \quad (2).$$

These mathematical expressions depend on the way chosen to get the first y1 and second y2 output signals (representative of the first S1 and second S2 symbols respectively), which are delivered by the combining module (or derotator) DM. So, they may vary as a function of the operations implemented by the combining module DM to determine the first y1 and second y2 output signals.

For the slave rake module SR to be capable of generating the first r1 and second r2 auxiliary composite symbols given in expressions (1) and (2), it may be conceived as illustrated in FIG. 3. In this illustrated example of embodiment, the slave rake module SR notably comprises first and second branches connected to the first DL1 and second DL2 delay lines respectively and each one comprising a descrambler DS1, DS2 and a despreader DP1, DP2.

The descrambler DS of the first branch (connected to DL1) is arranged for descrambling the first delayed signals (S1⊗ga)' and (S2⊗ga)' with the scrambling code sequence provided by a first sequence generator G1, in order to deliver first descrambled delayed signals.

The despreader DP1 of the first branch is arranged for despreading the first descrambled delayed signals with the spreading code sequence provided by a second sequence generator G2, in order to deliver first intermediate composite symbols F1 (with F1=S1⊗ga) and second intermediate composite symbols F2 (with F2=S2⊗ga), i.e. representative of the first S1 and second S2 symbols respectively times the first channel coefficient ga.

The descrambler DS2 of the second branch (connected to DL2) is arranged for descrambling the second delayed signals (S1⊗gb)' and (S2⊗gb)' with the scrambling code sequence provided by the first sequence generator G1, in order to deliver second descrambled delayed signals.

The despreader DP2 of the second branch is arranged for despreading the second descrambled delayed signals with the spreading code sequence provided by the second sequence generator G2, in order to deliver first intermediate composite symbols F3 (with F3=S1⊗gb) and second intermediate composite symbols F4 (with F4=S2⊗gb), i.e. representative of the first S1 and second S2 symbols respectively times the second channel coefficient gb.

Each despreader DP1, DP2 and each descrambler DS1, DS2 may be conceived in order to implement a logical AND function. So in this case they both act as a sign converter.

The slave rake module SR also comprises a first buffer B1, which is connected to the output of the despreader DP1 and a second buffer B2 which is connected to the output of the despreader DP2.

The first buffer B1 is provided for temporarily storing the first F1 and second F2 intermediate composite symbols output by the first branch, while the second buffer B2 is provided for temporarily storing the first F3 and second F4 intermediate composite symbols output by the second branch.

These buffers B1 and B2 may both be two taps buffers.

The slave rake module SR further comprises a first processing module CC3 which is provided for applying a complex conjugation to each first intermediate composite symbol F3 temporarily stored in the second buffer B2 in order to deliver a third intermediate composite symbol F5 (with F5=F3*=S1*⊗gb*).

The slave rake module SR further comprises a second processing module CC4 which is provided for applying two operations to each second intermediate composite symbol F4 temporarily stored in the second buffer B2. More particularly, it is arranged to first apply a complex conjugation to each second intermediate composite symbol F4 and then to change the sign thereof in order to deliver a fourth intermediate composite symbol F6 (with F6=−F4*=−S2*⊗gb*).

The slave rake module SR further comprises a first adder A2 provided for adding each first intermediate composite symbol F1, which is stored in the first buffer B1) to a respective corresponding fourth intermediate composite symbol F6, in order to deliver the first auxiliary composite symbol r1 (with r1=S1⊗ga−S2*⊗gb*).

The slave rake module SR further comprises a second adder A3 provided for adding each second intermediate composite symbol F2, which is stored in the first buffer B1) with each time corresponding third intermediate composite symbol F5, in order to deliver the second auxiliary composite symbol r2 (with r2=S2⊗ga+S1*⊗gb*).

Finally, in the illustrated example the slave rake module SR further comprises a third buffer B3 provided for temporarily storing the first r1 and second r2 auxiliary composite symbols.

This third buffer B3 may be a two-tap buffer.

As mentioned before, the combining module (or derotator) DM is provided for combining the first r1 and second r2 auxiliary composite symbols with the first ga* and second gb* channel coefficient estimates in order to determine the first y1 and second y2 output signal. It operates in an STTD mode.

These first y1 and second y2 output signals must be classically and representative of the first S1 and second S2 symbols respectively times the sum of the first channel coefficient estimate squared $ga^2$ and second channel coefficient estimate squared $gb^2$. So their mathematical expressions are given by:

$$y1=S1(ga^2+gb^2) \quad (3)$$

$$y2=S2(ga^2+gb^2) \quad (4)$$

Figure 4:
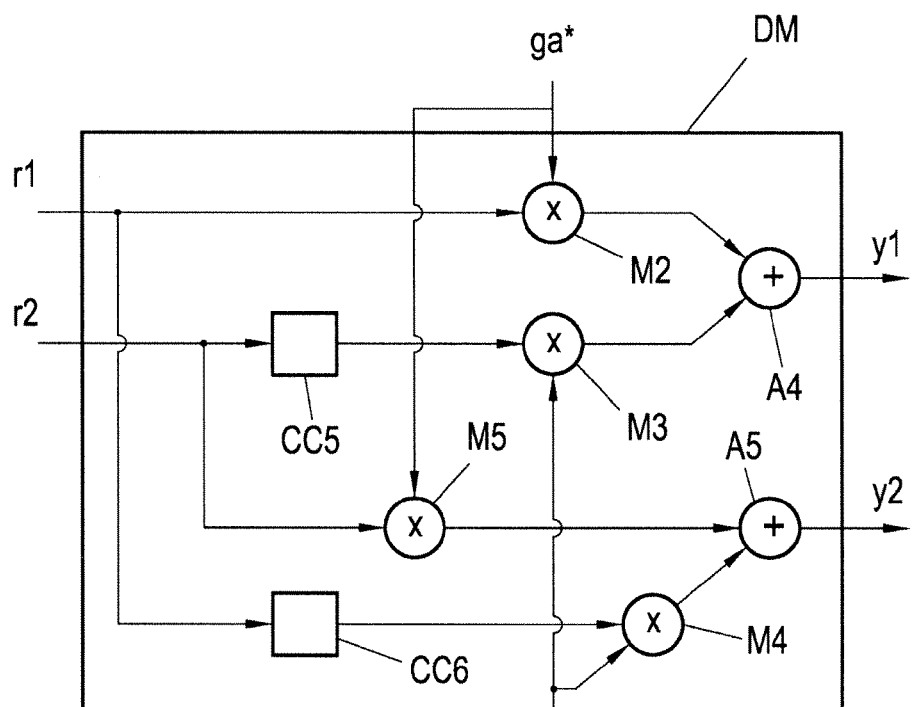

For the combining module DM to be capable of generating the first y1 and second y2 output signals given in expressions (3) and (4), from the first r1 and second r2 auxiliary composite symbols given in expressions (1) and (2) and the first ga* and second gb* channel coefficient estimates, it may be conceived as illustrated in FIG. 4. In this illustrated example of embodiment the combining module DM performs several operations which lead to the mathematical expressions (3) and (4). These operations are r1⊗ga*+r2*⊗gb*, which is equal to $S1(ga^2+gb^2)$ and then to y1, and −r1*⊗gb*+r2⊗ga*, which is equal to $S2(ga^2+gb^2)$ and then to y2. In other words, one has the following expressions:

$$y1=r1\otimes ga^*+r2^*\otimes gb^*=S1(ga^2+gb^2) \quad (5)$$

$$y2=-r1^*\otimes gb^*+r2\otimes ga^*=S2(ga^2+gb^2) \quad (6)$$

In order to perform the above mentioned operations, the combining module DM notably comprises a first multiplier M2 provided for multiplying the first auxiliary composite symbol r1 by the first channel coefficient estimate complex conjugate ga* output by the master slave module MR (illustrated in FIG. 2), in order to output a third auxiliary composite symbol r3 (with r3=r1⊗ga*).

The combining module DM also comprises a "third" processing module CC5 provided for applying a complex conjugation to the second auxiliary composite symbol r2 in order to output a second auxiliary composite symbol complex conjugate r2*.

The combining module DM further comprises a second multiplier M3 provided for multiplying the second auxiliary composite symbol complex conjugate r2* by the second channel coefficient estimate complex conjugate gb* output by the master slave module MR (illustrated in FIG. 2), in order to output a fourth auxiliary composite symbol r4 (with r4=r2*⊗gb*).

The combining module DM further comprises a first adder A4 provided for adding the third r3 and fourth r4 auxiliary composite symbols in order to deliver the first output signal y1 (with y1=r3+r4).

The combining module DM further comprises a "fourth" processing module CC6 provided for applying two operations to the first auxiliary composite symbol r1. More particularly, it first applies a complex conjugation to the first auxiliary composite symbol r1 to provide a first auxiliary composite symbol complex conjugate r1*, and then changes the sign of this first auxiliary composite symbol complex conjugate r1* in order to output a fifth auxiliary composite symbol r5 (with r5=−r1*).

The combining module DM further comprises a third multiplier M4 provided for multiplying the fifth auxiliary composite symbol r5 by the second channel coefficient estimate complex conjugate gb* output by the master slave module MR (illustrated in FIG. 2), in order to output a sixth auxiliary composite symbol r6 (with r6=−r1*⊗gb*).

The combining module DM further comprises a fourth multiplier M5 provided for multiplying the second auxiliary composite symbol r2 by the first channel coefficient estimate complex conjugate ga* output by the master slave module MR (illustrated in FIG. 2), in order to output a seventh auxiliary composite symbol r7 (with r7=r2*⊗ga*).

Finally the combining module DM comprises a second adder A5 provided for adding the sixth r6 and seventh r7 auxiliary composite symbols to deliver the second output signal y2 (with y2=r6+r7).

In the preceding description an example of embodiment of the master rake module MR has been described which comprises a first CC1 and a second CC2 processing module in order to output a first ga* and a second gb* channel coefficient estimate complex conjugate. But in a variant these processing modules CC1 and CC2 could be defined in the slave rake module SR. In this case, the master rake module MR outputs the first ga and second gb channel coefficient estimates.

More generally, other combinations of examples of embodiment of the master rake module MR, slave rake module SR and combining module (or derotator) DM may be envisaged since they lead to y1 (=$S1(ga^2+gb^2)$) and y2 (=$S2(ga^2+gb^2)$) starting from the first delayed signals (S1⊗ga)' and (S2⊗ga)' and the second delayed signals (S1⊗gb)' and (S2⊗gb)'.

The master rake module, MR, slave rake module SR and combining module (or derotator) DM may be integrated circuits realized in CMOS technology or in any technology used in chip industry fabrication or in a programmable processor, vector processor or DSP devices or processors.

The invention allows to gain in diversity but induces small degraded performance compared with a classical double receiver adapted for receive diversity.

The invention is not limited to the embodiments of communication receiver and mobile communication equipment described above, only as examples, but it encompasses all alternative embodiments which may be considered by one skilled in the art within the scope of the claims hereafter.

The invention claimed is:

1. A mobile communication device comprising:
   a first antenna element arranged to receive first signals representative of first and second symbols encoded with a first channel coefficient;
   a second antenna element arranged to receive second signals representative of said first and second symbols encoded with a second channel coefficient;
   first and second delay lines operative to delay said first and second signals respectively; and
   a machine coupled to the first and second antenna elements and to the first and second delay lines and capable of executing instructions embodied as software; and a plurality of software portions, wherein
   one of said software portions is configured to supply a master rake module with the first and second delayed signals and with a pilot channel sequence and is further configured to up-sample said pilot channel sequence at chip rate in order to mix said pilot channel sequence with said second delayed signals to deliver correlated delayed signals and to determine first and second channel coefficient estimates from said first delayed signals and said correlated delayed signals;
   one of said software portions is configured to supply a slave rake module with the first and second delayed signals and with a scrambling code sequence and a spreading code sequence and is further configured to determine first and second auxiliary composite symbols from said first and second delayed signals, scrambling code sequence and spreading code sequence; and
   one of said software portions is configured to supply a combining module with said first and second auxiliary composite symbols and with said first and second channel coefficient estimates in order to determine first and second output signals representative of said first and second symbols respectively times the sum of said first channel coefficient estimate squared and second channel coefficient estimate squared.

2. The mobile communication device according to claim 1, wherein said master rake module comprises:
   a sampling means arranged to up-sample said pilot channel sequence at chip rate, to deliver an up-sampled sequence;
   a multiplier means arranged to multiply said second delayed signals by said up-sampled sequence to deliver said correlated delayed signals;
   an adding means arranged to add said first delayed signals to said correlated delayed signals; and an estimation means arranged to determine first and second channel coefficient estimates from the result of said addition.

3. The mobile communication device according to claim 2, wherein said master rake module further comprises a first processing means arranged to apply a complex conjugation to said first channel coefficient estimate to deliver a first channel coefficient estimate complex conjugate.

4. The mobile communication device according to claim 2 wherein said master rake module further comprises a second processing means arranged to apply a complex conjugation to said second channel coefficient estimate to deliver a second channel coefficient estimate complex conjugate.

5. The mobile communication device according to claim 4 wherein said combining module comprises:
   a first multiplier means arranged to multiply said first auxiliary composite symbol by a first channel coefficient estimate complex conjugate to output a third auxiliary composite symbol;
   a third processing means arranged to apply a complex conjugation to said second auxiliary composite symbol to output a second auxiliary composite symbol complex conjugate;
   a second multiplier means arranged to multiply a second auxiliary composite symbol complex conjugate by said second channel coefficient estimate complex conjugate to output a fourth auxiliary composite symbol;
   a first adder arranged to add said third and fourth auxiliary composite symbols to deliver said first output signal;
   a fourth processing means arranged to apply a complex conjugation to said first auxiliary composite symbol and then to change the sign thereof to output a fifth auxiliary composite symbol;
   a third multiplier means arranged to multiply said fifth auxiliary composite symbol by said second channel coefficient estimate complex conjugate to output a sixth auxiliary composite symbol;
   a fourth multiplier means arranged to multiply said second auxiliary composite symbol by said first channel coefficient estimate complex conjugate to output a seventh auxiliary composite symbol; and
   a second adder arranged to add said sixth and seventh auxiliary composite symbols to deliver said second output signal.

6. The mobile communication device according to claim 5, wherein said combining module further comprises a first processing means arranged to apply a complex conjugation to said first channel coefficient estimate to deliver a first channel coefficient estimate complex conjugate.

7. The mobile communication device according to claim 5 wherein said combining module further comprises a second processing means arranged to apply a complex conjugation to said second channel coefficient estimate to deliver a second channel coefficient estimate complex conjugate.

8. The mobile communication device according to claim 1 wherein said slave rake module comprises:
   first and second branches connected to said first and second delay lines respectively and each comprising a descrambler, for descrambling said first or second delayed signals with a scrambling code sequence, and a despreader, for despreading said first or second descrambled delayed signals with a spreading code sequence in order to output first and second intermediate composite symbols representative of the first and second symbols respectively times the first or second channel coefficient;
   a first buffer means arranged to temporarily store the first and second intermediate composite symbols representative of the first symbol times the first channel coefficient and the second symbol times the first channel coefficient respectively;
   a second buffer means arranged to temporarily store the first and second intermediate composite symbols representative of the first symbol times the second channel coefficient and the second symbol times the second channel coefficient respectively;
   a first processing means arranged to apply a complex conjugation to said first intermediate composite symbol stored in said second buffer means to deliver a third intermediate composite symbol;
   a second processing means arranged to apply a complex conjugation to said first intermediate composite symbol stored in said second buffer means and then to change the sign thereof to deliver a fourth intermediate composite symbol;
   a first adding means arranged to add said first intermediate composite symbol stored in said first buffer means to said fourth intermediate composite symbol to deliver said first auxiliary composite symbol;
a second adding means arranged to add said second intermediate composite symbol stored in said first buffer means to said third intermediate composite symbol to deliver said second auxiliary composite symbol; and
a third buffer means arranged to temporarily store said first and second auxiliary composite symbols.

9. A method for the processing of signals received by a communication receiver, the communication receiver including a first antenna element arranged to receive first signals representative of first and second symbols encoded with a first channel coefficient, a second antenna element arranged to receive second signals representative of said first and second symbols encoded with a second channel coefficient and first and second delay lines to delay said first and second signals respectively, said method comprising:
up-sampling a pilot channel sequence at chip rate in order to mix said pilot channel sequence with said second delayed signals to deliver correlated delayed signals and to determine first and second channel coefficient estimates from said first delayed signals and said correlated delayed signals;
determining first and second auxiliary composite symbols from said first and second delayed signals, a scrambling code sequence and a spreading code sequence; and
combining said first and second auxiliary composite symbols with said first and second channel coefficient estimates in order to determine first and second output signals representative of said first and second symbols respectively times the sum of said first channel coefficient estimate squared and second channel coefficient estimate squared.

10. A mobile communication device comprising:
a first antenna element arranged to receive first signals representative of first and second symbols encoded with a first channel coefficient;
a second antenna element arranged to receive second signals representative of said first and second symbols encoded with a second channel coefficient;
first and second delay lines operative to delay said first and second signals respectively;
a first circuit configured to up-sample said pilot channel sequence at chip rate in order to mix a pilot channel sequence with said second delayed signals to deliver correlated delayed signals and to determine first and second channel coefficient estimates from said first delayed signals and said correlated delayed signals;
a second circuit configured to determine first and second auxiliary composite symbols from said first and second delayed signals, a scrambling code sequence and a spreading code sequence; and
a third circuit configured to combine said first and second auxiliary composite symbols with said first and second channel coefficient estimates in order to determine first and second output signals representative of said first and second symbols respectively times the sum of said first channel coefficient estimate squared and second channel coefficient estimate squared.

* * * * *